Feb. 21, 1939.   N. A. PALMGREN   2,148,406
RADIAL PLAIN BEARING
Filed Dec. 6, 1935
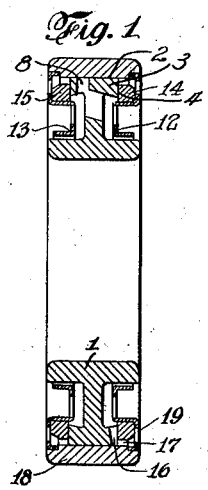
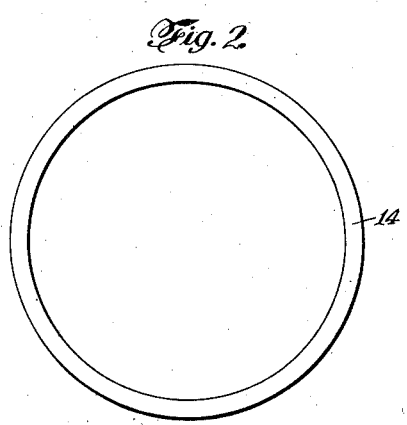
INVENTOR.
Nils Arvid Palmgren
BY
his ATTORNEY.

Patented Feb. 21, 1939

2,148,406

UNITED STATES PATENT OFFICE 2,148,406

RADIAL PLAIN BEARING

Nils Arvid Palmgren, Goteborg, Sweden, assignor to Aktiebolaget Svenska Kullagerfabriken, Goteborg, Sweden, a corporation of Sweden Application December 6, 1935, Serial No. 53,121 In Sweden December 18, 1934

6 Claims. (Cl. 308—122)

The present invention relates to improvements in radial plain bearings, especially bearings of standardized dimensions which may be sold and handled as separate units.

The object of the present invention is to provide a radial plain bearing capable of taking thrust loads and which at the same time can be contained within the same dimensions as a ball bearing.

A further object of the invention is to provide a bearing in which the radial load carrying capacity is not affected by thrust loads.

A still further object of the invention is to provide a bearing which, as required, will be capable of taking up thrust in both directions or in only one direction or which may be free to move in both directions.

Another object of the invention is to provide a bearing which can be inexpensively manufactured.

Another object of the invention is to provide a bearing in which the internal and external surfaces will have the same length in an axial direction of the bearing as the corresponding surfaces of a ball bearing, and which may be handled as a self-contained unit.

It is also an object of the invention to provide a bearing having thrust rings for taking thrust and guard plates or other equivalent members, such as oil circulating plates, wherein the thrust is transmitted through the plates.

The invention is illustrated on the accompanying drawing.

Fig. 1 shows a cross section in an axial plane through a bearing according to one form of the invention and Fig. 2 is a side view of a guide ring for the same bearing.

The dimensions of the bearings according to all the forms of the invention illustrated can be kept entirely within the dimensions standardized for ball bearings.

The bearing illustrated in Fig. 1 comprises an inner bearing ring 1, having an I-shaped cross section, the ring having an external cylindrical sliding surface 2. The side faces of the outer flange 3 are provided with substantially plane sliding surfaces 4 for taking thrust. The outer bearing ring 18 has an internal cylindrical sliding surface. Oil which enters the bearing, is thrown out by centrifugal force through passages 8 to the sliding surface for radial load.

Oil circulating plates 12, 13 are shown at both sides. Thrust rings 14, 15 are mounted adjacent to the circulating plates. Between the thrust rings and the outer ring 18 there is play, and the thrust rings are therefore connected to the outer ring only through the oil circulating plates, which are provided with suitable surfaces for centrally positioning the thrust rings. Since the oil circulating plates are relatively thin they have a certain amount of flexibility, which enables the thrust rings to adjust themselves to the surfaces of the inner ring. The oil circulating plates also retain the thrust rings in position so that the bearing can be handled as a self-contained unit. The thrust rings are of a simple design as shown in Fig. 2. The oil circulates through the channel 16 and the space 17 between the thrust ring 14 and the outer ring 18 and further through openings 19 in the oil circulating plates, whereby the lubrication will be very effective.

The thickness of the thrust rings and oil circulating plates is equal to the distance from the thrust bearing surface 4 on the inner ring to the side face 11 of the same ring, and the whole bearing can therefore be contained within the desired dimensions so that it can in all cases be replaced by a ball bearing of the same dimensions. Both the bearing rings of the form of the invention shown have internal and external surfaces adapted for being fitted to a shaft or in a housing. These surfaces are of the same axial length as the corresponding surfaces of a ball bearing of corresponding dimensions, whereby the reliability and accuracy of the bearing mounting will be the greatest possible.

If, for instance, the thrust ring 15 is removed the bearing will be capable of taking thrust only in one direction. If both thrust rings are removed the bearing will be free in both directions.

When taking up thrust, the thrust rings are supported by shoulders on the shaft, which are, however, not shown on the drawing. In bearings designed only for light loads the thrust rings may be retained in place by pressing them onto the inner ring. The thrust rings can, of course, be fixed to the bearing rings by means of screws, rivets or the like.

Having thus described my invention, I claim and desire to secure by Letters Patent:

1. A plain bearing having an outer bearing ring and an inner bearing ring, there being a sliding surface on each of said bearing rings for carrying radial load, one of said bearing rings having a sliding surface for transmitting thrust to a thrust taking member disposed adjacent thereto, and an oil circulating plate connected to the outer bearing ring, the thrust taking member being loosely connected to the outer bearing ring through the medium of the oil circulating plate.

2. A plain bearing having an outer bearing ring and an inner bearing ring, there being a sliding surface on each of said bearing rings for carrying radial load, one of said bearing rings having a separate sliding surface for transmitting thrust to a thrust taking member disposed adjacent thereto, there being a guard plate disposed at each side of the bearing, and yieldably connected to the outer bearing ring, the thrust taking member and the guard plate being formed and disposed to transmit thrust from the thrust taking member to a support through the guard plate.

3. A plain bearing having an outer bearing ring and an inner bearing ring, there being a sliding surface on each of said bearing rings for carrying radial load, one of said bearing rings having a separate sliding surface for transmitting thrust to a thrust taking member disposed adjacent thereto, there being a flexible guard plate disposed at each side of the bearing, and yieldably connected to the outer bearing ring, the thrust taking member and the guard plate being formed and disposed to transmit thrust from the thrust taking member to a support through the guard plate.

4. A plain bearing having an outer bearing ring and an inner bearing ring, there being a sliding surface on each of said bearing rings for carrying radial load, one of said bearing rings having a separate sliding surface for transmitting thrust to a thrust taking member disposed adjacent thereto, there being a guard plate disposed at each side of the bearing, and yieldably connected to the outer bearing ring, the thrust taking members being separate and distinct from the guard plates, the thrust taking member and the guard plate being formed and disposed to transmit thrust from the thrust taking member to a support through the guard plate.

5. A plain bearing having an outer bearing ring and an inner bearing ring, there being a sliding surface on each of said bearing rings for carrying radial load, one of said bearing rings having a sliding surface for transmitting thrust to a thrust taking member disposed adjacent thereto, there being a guard plate disposed at one side of the bearing and yieldably connected to the outer bearing ring, the thrust taking member and the guard plate being formed and disposed to transmit thrust from the thrust taking member to a support through the guard plate, means being provided on the guard plate for centrally positioning the thrust taking member.

6. A plain bearing having an outer bearing ring and an inner bearing ring, there being a sliding surface on each of said bearing rings for carrying radial load, one of said bearing rings having a separate thrust taking surface in sliding engagement with a sliding surface on a thrust taking member, there being a guard plate disposed at one side of the bearing and yieldably carried by the other bearing ring, the thrust taking member and the guard plate being formed and disposed to transmit thrust from the thrust taking member to a support through the guard plate.

NILS ARVID PALMGREN.